United States Patent [19]

Meader, Jr.

[11] Patent Number: 4,689,268

[45] Date of Patent: Aug. 25, 1987

[54] COATED CONCRETE SURFACE AND PROCESS FOR COATING

[75] Inventor: Arthur L. Meader, Jr., Berkeley, Calif.

[73] Assignee: Chevron Research Company, San Francisco, Calif.

[21] Appl. No.: 891,927

[22] Filed: Jul. 30, 1986

Related U.S. Application Data

[63] Continuation of Ser. No. 761,129, Jul. 31, 1985, abandoned, which is a continuation of Ser. No. 654,605, Sep. 25, 1984, abandoned, which is a continuation of Ser. No. 437,785, Oct. 29, 1982, abandoned.

[51] Int. Cl.$^4$ .................. B32B 27/38; B32B 27/40
[52] U.S. Cl. .................. 428/413; 427/136; 427/385.5; 427/386; 427/387; 427/393.6; 427/407.1; 428/423.1; 428/425.5; 428/447; 428/448; 428/474.4; 428/480
[58] Field of Search ............ 427/136, 138, 385.5, 427/386, 387, 393.6, 407.1; 428/414, 430, 423.1, 425.5, 447, 448, 474.4, 480, 489, 500; 404/32, 75, 82

[56] References Cited

U.S. PATENT DOCUMENTS

| | | | |
|---|---|---|---|
| 3,105,771 | 10/1963 | Simpson et al. | 427/138 |
| 3,334,555 | 8/1967 | Nagin et al. | 427/136 |
| 3,546,148 | 12/1970 | Diamond et al. | 427/393.6 |
| 3,900,687 | 8/1975 | Meader et al. | 427/138 |
| 4,015,044 | 3/1977 | Ranney et al. | 428/425.5 |
| 4,025,683 | 5/1977 | Meader et al. | 427/138 |
| 4,375,498 | 3/1983 | LeMinez et al. | 427/407.1 |

*Primary Examiner*—Sadie L. Childs
*Attorney, Agent, or Firm*—S. R. LaPaglia; R. C. Gaffney; J. J. DeYoung

[57] ABSTRACT

Disclosed is concrete surface coated with a cast in place surfacing composition comprising at least three layers, in order from the concrete surface:

- a first layer comprising: (1) a hard, epoxy resin, and (2) an inert, inorganic filler material consisting essentially of hollow ceramic beads;
- a second layer comprising a bonding agent which improves adhesion between said first and third layers, and;
- a third layer comprising: (1) 20 to 80 parts by weight of a polyurethane, said polyurethane formed by reacting a polyisocyanate with a polyurethane precursor at a mole ratio of 0.8 to 1.4:1, said polyurethane precursor comprising 15 to 60 parts by weight of a high molecular weight polyol and 2 to 10 parts by weight of a low molecular weight chain stiffener, (2) 20 to 80 parts by weight of a substantially non-volatile extender, and (3) 0 to 20 parts by weight of a volatile solvent.

11 Claims, No Drawings

4,689,268

COATED CONCRETE SURFACE AND PROCESS FOR COATING

This is a continuation of application Ser. No. 761,129, filed July 31, 1985 which in turn is a continuation of Ser. No. 654,605 filed Sept. 25, 1984 which is a continuation of Ser. No. 437,785 filed Oct. 29, 1982, all now abandoned.

BACKGROUND OF THE INVENTION

A urethane-based coating composition has been developed which finds particular use in construction and industrial applications. For example, bridge decking is susceptible to severe corrosion problems from winter road salting where the bridge deck is constructed from Portland cement concrete. The concrete is reinforced with steel reinforcing rods and is somewhat porous. When salt solution penetrates the concrete, it corrodes the steel, whose corrosion products, in turn, expand the concrete forcing it outward, spalling it from the bridge deck. The urethane-based composition is also used over underwater cement or concrete surfaces such as a pond liner or reservoir. This coating helps eliminate or reduce contamination and water seepage problems. Both examples illustrate eivronmentally rigorous usages, particularly requiring a specialized protection as disclosed in the present invention.

Traditionally, seal coats or surfacing compositions have been applied directly to concrete surfaces or structures to seal or protect them. One particular problem experienced in applying these coats, however, is the formation of bubbles in and under the coating. This problem is particularly severe with concrete containing a high percentage of entrained air. Before the mid-1960's concrete bridge decks, for example, contained very little air, usually less than 4%. Since then bridge decking concrete has been required to have about 6.5% entrained air to provide resistance to scaling. With this much air entrapped in the concrete, seal coats applied over it suffer severe air bubble formation problems. The bubbles are very difficult to remove and in most cases their removal destroys the integrity of the seal coat. On the other hand, if the bubbles are not removed the seal coat is considerably weakened at these points.

An additional problem which develops in the application of a seal coat over concrete is the presence of some foreign material such as mud, silt or grease which interferes with the adhesion of the seal coat to the concrete. This is a particular problem in situations where the concrete and surfacing coat are to be maintained underwater or in a situation, such as a roof top, which may be susceptible to intermittent wetting by rain. The presence of foreign matter such as mud, etc. gives rise to large surface-failure blisters or bubbles ranging from 6 inches to some 3 feet or larger in diameter.

U.S. Pat. No. 4,025,683 discloses a urethane based waterproofing coating composition which attempts to overcome the type of bubbling problem encountered in the first instance cited above; namely, air trapped in the concrete expanding under elevated temperature and rising to the surface upon application of the coating membrane. The invention of that patent seeks to address that problem by providing a primer coat consisting of a paint binder and a heat absorber which draw the entrapped air from the surface of the concrete and eliminate it prior to the application of the surface membrane.

The present invention helps solve not only that problem, entrapped air rising to the surface, but more particularly deals with adhesive failure after the surface membrane has cured due to the second type of bubbling failures, those caused by foreign matter interfering with the adhesion of the surface coating to the concrete. Moreover, the surface of the concrete normally contains small irregularities which trap air in the surface upon application of the surfacing composition. These also contribute to the failure of adhesion, independent of any temperature rise or fall. Both of these additional bubbling problems are overcome by the present invention, primarily because of the enhanced adhesive nature of the prime coat, versus the heat-induced air bubble expansion of the prior art.

SUMMARY OF THE INVENTION

A cast-in-place surfacing composition is provided, for application over concrete or cement which comprises (A) a prime coat comprising: (1) a hard, coating resin, and (2) an inert, inorganic filter material, preferably less dense than the hard coating resin, to improve adhesion and retard penetration of the prime coat into the concrete; and (B) a membrane coat comprising: (1) a polyurethane formed by reacting a mixture of high molecular weight polyol and low molecular weight chain stiffener with a polyisocyanate, (2) a substantially inert, nonvolatile extender, and (3) a volatile solvent. Additionally, a bonding agent which further improves the adhesion of the membrane coat over the prime coat may be applied between the two coats.

If the coated surface is subject to heavy wear such as heavy vehicular traffic, snow plowing, tire chains or other severe abuse, a wearing surface should also be applied over the membrane coat. Particularly on bridges, asphalt concrete provides an excellent such wearing surface. In light use areas such as parking decks, ponds and reservoirs, or roofing applications, the highly durable membrane coat provides a satisfactory wearing surface by itself. For long term protection from ultraviolet degradation or for decorative purposes a coating may also be applied to the surface or an aggregate such as gravel may be sprinkled on the membrane before it has cured.

DETAILED DESCRIPTION OF THE INVENTION

A polyurethane-based surfacing composition with an adhesion-promoting prime coat for application over concrete, particularly Portland cement concrete, has been provided comprising, in order from the concrete surface: (A) a prime coat comprising 60 to 80% by weight, preferably 70% by weight of a hard, coating resin, and 20 to 40% by weight, preferably 30% by weight of an inert, inorganic filter; and (B) a membrane coat comprising 20 to 80, preferably 40 to 60 parts by weight of (1) a polyurethane formed by reacting 15 to 60, preferably 30 to 55 parts by weight of (a) a polyurethane precursor, with 6 to 20, preferably 10 to 15 parts by weight of (b) a polyisocyanate; (2) 20 to 80, preferably 40 to 60 parts by weight of a substantially inert nonvolatile extender; and (3) 0 to 20, preferably 0 to 10 parts of a volatile solvent. The polyurethane precursor of the membrane coat comprises a mixture of 15 to 60, preferably 30 to 55 parts by weight of a high molecular weight polyol and 2 to 10, preferably 4 to 8 parts by weight of a low molecular weight chain stiffener.

Additionally, the preferred embodiment of the present invention provides for a bonding agent to be applied between the prime coat layer and the membrane coating layer to promote additionally the adhesion of the membrane layer to the concrete surface.

THE PRIME COAT

As described above the prime coat of the present invention comprises a hard, coating resin, dissolved in an appropriate solvent sufficient to permit it to be easily applied or sprayed to the concrete surface. Ordinarily concrete is the most difficult surface on which to apply the membrane coating and the prime coat permits significantly increased adhesion in two ways: (1) by filling in the irregular porous surface in which air can be become trapped upon coating, giving rise to failures in the surface membrane itself, and (2) by mitigating adhesion failure after the membrane base has cured occurring due to grease, mud or other foreign matter coming between the concrete surface and the binder material. By applying the prime coat described herein the surface adhesive capabilies are increased and the prevention of the formation of large blisters through adhesion failure significantly reduced.

The hard coating resin of the prime coat may be any hard coating resin normally used for its adhesion properties. The resin is dissolved in an appropriate solvent to permit convenient application such as by spraying. Resins finding particular application herein include epoxies such as epoxy polyamines, or epoxy polyamides, acrylic resins, either water or non-water soluble, and unsaturated polyesters.

One resin finding particular use in the present invention is a two-component epoxy polyamide, trade named Primer CE, manufactured by the Toch Division of Carboline Company. When this resin is used alone as a prime coat material, however, it is has been found to be unsatisfactory upon the addition of the surface membrane.

When the Primer CE was used alone to prime the surface prior to membrane coating, the peel strength of the resulting coating was only about 3.0 pounds per inch with a 100% adhesive failure.

Peel strength is a basic measure of adhesion and is measured in pounds per inch, affixed to a standard Instron Tensile Tester using a one-inch wide strip of the surface membrane coat pulled from the prime coat at either a 90° or 180° angle. Any measure under 5 pounds per inch is regarded as unsatisfactory, 5 to 10 pounds per inch is regarded as fair, 10 to 15 is regarded as good, and anything over 15 is regarded as excellent peel strength. As stated above, the resin alone tested at 3 lb/in., an unacceptable result.

Additionally, the adhesion of the coating is measured in adhesive failure or in the alternative (and opposite), cohesive failure. What is meant by adhesive failure is that in a 100% adhesive failure, all of the coating failed to adhere and was removed when peeled on testing, less than 100% means that some of the coating remained on the surface. A 75% adhesion failure, for example, means that 25% of the coating remained. An alternative measure of the adhesion ability is cohesive failure. This is the inverse of adhesive failure; i.e., 100% cohesive failure means that the coating itself failed on peeling and that a complete layer of the coating remained behind on the surface coated. To summarize, a perfect coating would yield a 0% adhesive failure and a 100% cohesive failure.

In order to improve the adhesion of the membrane coating using the prime coat, a stable inorganic filler was added to the coating resin. The preferred amount by weight of filler is from 20% to 40% with 30% most preferred. The inorganic filler provides two functions in the prime coat: (1) it facilitates the prime coat material remaining on the surface of the concrete rather than penetrating into it, permitting greater filling in of the irregular porous surface texture and improving the adhesive capability, and (2) provides sites for the bonding agent discussed below to attach, also greatly facilitating adhesion.

In a preferred embodiment of the present invention hollow ceramic beads, specifically ECCOSPHERES FA-A manufactured by the Emerson and Cuming Company, having a particle density of 0.65 grams per cubic centimeter are used. A filler material less dense than the coating resin is preferred because it permits the filler to remain in suspension in the resin and not settle out resulting in even spreading of the filler material throughout the prime coat upon application. Filler materials denser than the epoxy may be used, however, but the prime coat material must be stirred or mixed prior to application to permit the filler to be evenly distributed.

Using the 30% by weight hollow ceramic bead filler material in the prime coat, the number of surface blisters or air bubbles in the coating upon cure was reduced and the dry peel strength was over 17 pounds per inch, with 100% cohesive failure (0% adhesive failure). Additionally, the wet peel strength after a one week soaking in water was as high or higher, with a 75% cohesive failure.

The prime coat is applied in a relatively thin layer so that the air bubbles can easily reach the surface and escape. The prime coat will usually be applied in a thickness from about 1 to 3 mils dry film thickness. Under normal conditions on a normally porous surface (concrete having up to 6 to 7% entrained air) about 250 square feet per gallon yield satisfactory results. Of course, a rougher porous surface will require more and a smoother surface will require less of the prime coat.

The prime coat may be applied in any convenient and conventional manner such as by spraying, spreading or brushing on. Additionally, it should set up to a rigid base, facilitating the application of the membrane over it. Since the primer also eliminates most of the small displacement type blisters which show up in the membrane surface when applied over concrete, it may also serve to tie together weak areas of concrete or a small amount of laitance or dust on the surface.

THE MEMBRANE COAT

The surface membrane composition is essentially similar to the membrane composition disclosed in U.S. Pat. Nos. 3,900,687 and 4,025,683 and an application, inventor Meader, filed Sept. 30, 1982.

The Polyurethane

The polyurethane of the membrane composition is prepared by reacting a polyisocyanate with a polyurethane precursor. The precursor is a blend of high molecular weight polyols and low molecular weight chain stiffeners.

The high molecular weight polyols are primarily diols although there may be minor amounts of higher order polyols present. Preferably, the polyols will have a molecular weight ranging from 2,000 to 4,000. At least two of the hydroxyl groups will usually be at or near the terminal carbon atoms and will be separated by hydrocarbon chains of at least 40 carbon atoms. Preferably, the diols are primary alcohols. The polyols may also be derived from such monomers as butadiene, styrene, isoprene, etc.

The low molecular weight chain stiffener is incorporated to increase the tensile strength and the tear strength of the composition. The chain stiffeners include polyols, polyamines and hydroxyamines. They generally have from about 2 to about 12 atoms separating the more distant hydroxy and/or amine groups and normally contain from 4 to 18 carbon atoms. Examples of suitable chain stiffeners include: 3-dimethyl-amino-1,2-propane diol; diethanolamine; 1,4-butanediol; tolidine; diethylene glycol; and N,N-bis-(2-hydroxypropyl)aniline. The mole ratio of the isocyanate reactive groups of the low molecular weight chain stiffener to the isocyanate reactive groups with high molecular weight polyol will range from 0 to 3:1, and will preferably be about 1.5 to 2.5:1.

The polyisocyanates will generally be diisocyanates or mixtures of diisocyanates with higher orders of polyisocyanates normally not exceeding five isocyanate groups. Preferably, diisocyanates will be used, generally having from about 6 to 24 carbon atoms. Illustrative polyisocyanates include bis(isocyanatophenyl)methane, diphenyldiisocyanate, toluene diisocyanate (TDI), polyphenylpolymethylene isocyanate (PAPI), and poly(methylenephenylenepolyisocyanate). The first polyisocyanate is preferred. The ratio of isocyanate groups to isocyanate reactive groups used to form the polyurethane in the mixture is normally in the range of 0.8 to 1.4:1, preferably 1.05 to 1.15:1. A catalyst is also required in sufficient quantity to effect the desired curing of the polyurethane. The usage level will generally range from about 0.005 to about 0.2 weight percent of the total composition. Suitable catalysts include dibutyl tin dilaurate, diazabicyclooctane, and stannous octoate. Dibutyl tin dilaurate is preferred.

The Extender

A variety of cutback asphalts are suitable. Cutback asphalts are mixtures of asphalt and a volatile solvent. Suitable asphalts include those having penetrations from about 40 to about 200, preferably 50 to 150, at 77° C. The solvents used in preparing cutback asphalts are generally volatile; that is, they usually have boiling points such that they evaporate from the asphalt within a short period after the asphalt cutback is spread out to form the surface. The polyurethane precursors can also be mixed with an extender oil instead of or in addition to the cutback asphalt. The oil should not bleed or exude from the material ultimately prepared from the components.

The Volatile Solvent

The material also contains a volatile solvent to lower the viscosity of the uncured mixture sufficiently to improve its handling characteristics and spreadability or sprayability. Most of the solvent evaporates from the material during and after curing. Suitable solvents include aromatic, low-boiling petroleum hydrocarbons including toluene and xylene and/or aliphatic, low-boiling hydrocarbons such as hexane, heptane, cyclohexane, mineral spirits, naphtha and the like.

The components of the membrane composition, excluding the polyisocyanate, are generally referred to as the premix. This refers to the convenience in mixing and/or storing them ahead of the time when they will be used. The premix comprises the extender, high molecular weight polyol, low molecular chain stiffener, and a catalyst.

The surface membrane coat is prepared by intimately mixing all of the components detailed above. One method of accomplishing this is to bring each of materials separately to the job site and mixing them together at that point. However, for convenience, it is better to prepare the premix at a central location and then activate it with polyisocyanate at the job site. This can be accomplished by any convenient mixing method, one of the most convenient being an ordinary cement or plaster mixer.

The membrane coat can be applied in a variety of ways over the prime coat. Ordinarily, the membrane coat is mixed in the plaster mixer and then applied using a squeegee. Since the material is moderately self-leveling, small imperfections introduced by the squeegee will be completely insignificant. An alternative method of applying the membrane coat is by spray application using two-component automatic proportioning and mixing spray equipment. Using this equipment avoids the need to handle partially cured materials arising through the use of single-component spray equipment.

THE BONDING AGENT

To additionally promote the adhesion of the membrane coat to the prime coat and thereby to the concrete surface, it has been found to be particularly desirable to use a bonding agent applied over the prime coat before application of the membrane coat. One particular reason for the use of the inorganic filler in the prime coat is to provide sites to which the bonding agent can adhere.

The bonding agent is any material which improves the adhesion between the prime coat and the membrane coat and the underlying surface. Materials which have been found to be highly suitable for this purpose are silicon compounds, especially those having 2 or 3 hydrolyzable groups attached to a silicon atom, and which have attached to the silicon molecule at least one group such as an hydroxyl or amino group which will react with an isocyanate. Examples of suitable bonding agents are N-(betaaminoethyl)-gamma-aminopropyltrimethoxysilane, gammaaminopropyltriethoxysilane, gamma-glycidoxypropyl trimethoxysilane and gamma-mercaptopropyltrimethoxysilane. If a silane is used the silicon atoms should have 2 and preferably 3 hydrolyzable groups. If silane oligomers are used, the number of hydrolyzable groups may be as low as one per silicon atom in the oligomer; preferably there will be two hydrolyzable groups present per silicon atom.

The bonding agent is applied in a dilute solution in a conventional manner, preferably spraying using the proper choice of solvent. The solution will ordinarily be applied at about ½ to 2 gallons per 300 nominal square feet of surface area. The solvent for the bonding agent, as well as the prime coat, should be any solvent which is substantially inert towards the bonding agent or prime coat material itself. Preferably the solvent is relatively volatile and has a boiling point of less than 130° C. Suitable solvents include benzene, toluene, xylene, methylethyl ketone, n-butyl acetate, ispropyl alcohol and the like. Since these solvents are flammable appropriate fire prevention measures should be taken.

The following example further illustrates the invention.

EXAMPLE 1

30% by weight of hollow ceramic beads (ECCOSPHERES FA-A, manufactured by Emerson and Cuming) having a particle density of 0.65 grams per cubic centimeter were intimately mixed with 70% by weight of two-component epoxy polyamide, trade named Primer CE manufactured by the Toch Division of Carboline Company. The prime coat composition was applied at the rate of 250 square feet per gallon over Portland cement concrete, giving a 2 ml dry film thickness. The prime coat was then allowed to cure on standing overnight.

Following the prime coat cure, a 0.5% solution of Chevron Bonding Agent comprising N-(betaaminoethyl)-gamma-aminopropyl-trimethoxysilane (sold under the trade name Dow Corning Z-6020 or Union Carbide A-1120) dissolved in isopropyl alcohol to make an 0.5% solution was applied using conventional spraying methods such as a Hudson Sprayer at a rate of 0.015 gallons per square yard and was allowed to dry for 30 minutes.

A membrane surface was then applied at the rate of approximately 0.6 gallons per square yard using rubber squeegees to distribute it over the desired area. The membrane coating consisted of a premix consisting of 50 parts by weight of a cutback asphalt comprising 86 volumes of 50-65 penetration asphalt and 14 volumes of a largely aliphatic low-boiling petroleum hydrocarbon having a midpoint of its boiling range at 265° F.; 42 parts by weight of polybutadiene diol (average molecular weight of 2,500 to 2,800), 6.7 parts by weight N,N-bis(2-hydroxypropyl) aniline, and 0.01 parts by weight dibutyl tin dilaurate. The premix was thoroughly mixed prior to application with an activator comprising 14.4 parts by weight to 100 parts by weight of premix of a modified methylene diphenyl diisocyanate (Isonate 143 L manufactured by Upjohn). The surface membrane was allowed to cure overnight and dried to a smooth, glossy surface free of blisters, bubbles or pimples. This surface upon curing was tested according to the methods outlined above and yielded the results disclosed below in Table I.

TABLE I

| | |
|---|---|
| Dry Peel Strength, pounds per inch | 17 |
| Adhesive Failure, % | 100 |
| Wet Peel Strength, pounds per inch | 17+ |
| Cohesive Failure, % | 75 |

For comparative purposes the a surface was prepared as detailed above except that no prime coat was used. The results of that test are tabulated in Table II below.

TABLE II

| | |
|---|---|
| Dry Peel Strength, pounds per sq. inch | 19 |
| Adhesive Failure, % | 100 |
| Wet Peel Strength, pounds per inch | 17.6 |
| Cohesive Failure, % | 0(100% Adhesive) |
| Blistering | 10 times more than with primer as above |

What is claimed is:

1. A concrete surface coated with a cast in place surfacing composition comprising at least three layers, in order from the concrete coated surface:
   a first layer comprising: (1) a hard, epoxy resin, and (2) an inert, inorganic filler material consisting of hollow ceramic beads, said ceramic beads being less dense than said epoxy resin;
   a second layer comprising a bonding agent which improves adhesion between said first and third layers; and
   a third layer comprising (1) 20 to 80 parts by weight of a polyurethane, said polyurethane formed by reacting a polyisocyanate with a polyurethane precursor at a mole ratio of 0.8 to 1.4:1, said polyurethane precursor comprising 15 to 60 parts by weight of a high molecular weight polyol and 2 to 10 parts by weight of a low molecular weight chain stiffener, (2) 20 to 80 parts by weight of a substantially non-volatile extender, and (3) 0 to 20 parts by weight of a volatile solvent.

2. The concrete coated surface of claim 1 wherein:
   said first layer consists of: (1) 60 to 80 percent by weight of said epoxy resin, and (2) 20 to 40 percent by weight of hollow ceramic beads, said ceramic beads being less dense than said epoxy resin;
   said third layer consists of: (1) 60 to 80 percent by weight of said epoxy resin, and (2) 20 to 40 percent by weight of hollow ceramic beads, said ceramic beads being less dense than said epoxy resin; and
   said third layer consists essentially of: (1) 40 to 60 parts by weight of a polyurethane, said polyurethane formed by reacting a polyisocyanate with a polyurethane precursor at a mole ratio of 0.8 to 1.4:1, said polyurethane precursor comprising 30 to 55 parts by weight of a high molecular weight polyol and 4 to 8 parts by weight of a low molecular weight chain stiffener, (2) 40 to 60 parts by weight of a substantially inert, non-volatile extender, and (3) 0 to 10 parts by weight of a volatile solvent.

3. The concrete coated surface of claim 2 wherein: said first layer consists of: (1) about 70 percent by weight of said epoxy resin, and (2) about 30 percent by weight of said ceramic beads.

4. The concrete coated surface of claim 3 wherein the first layer has a thickness of between 1 and 3 mil.

5. The concrete coated surface of claim 4 wherein said epoxy resin is epoxy polyamide.

6. The concrete coated surface of claim 5 wherein said ceramic beads are less dense than said epoxy resin.

7. The concrete coated surface of claim 6 wherein said bonding agent is selected from the group comprising silane compounds.

8. The concrete coated surface of claim 6 wherein said bonding agent comprises N-(betaaminoethyl)-gamma-aminopropyltrimethoxysilane.

9. A process for coating a concrete surface comprising:
   applying a first layer to said surface, said first layer consisting of: (1) a hard epoxy resin, and (2) an inert, inorganic filler material consisting of hollow ceramic beads, said beads being less dense than said epoxy resin;
   allowing said first layer to level out and fill in irregularities on the surface;
   allowing said first layer to cure;
   applying as a second layer a bonding agent to said first layer; and
   applying to said second layer a third layer coating comprising: (1) 20 to 80 parts by weight of a polyurethane, said polyurethane formed by reacting a polyisocyanate with a polyurethane precursor at a mole ratio of 0.8 to 1.4:1, said polyurethane precursor comprising 15 to 60 parts by weight of a high molecular weight polyol and 2 to 10 parts by weight of a low molecular weight chain stiffener, (2) 20 to 80 parts by weight of a substantially non-volatile extender, and (3) 0 to 20 parts by weight of a volatile solvent.

10. The process for coating of claim 9 wherein said first layer comprises 60 to 80 percent by weight of epoxy resin and 20 to 40 percent by weight ceramic beads.

11. The process for coating of claim 10 wherein said bonding agent is a silane.

* * * * *